(12) United States Patent
Tang et al.

(10) Patent No.: US 10,554,867 B2
(45) Date of Patent: Feb. 4, 2020

(54) CAMERA MODULE APPLIED TO TERMINAL AND TERMINAL INCLUDING SAME

(71) Applicant: GUANGDONG OPPO MOBILE TELECOMMUNICATIONS CORP., LTD., Dongguan, Guangdong (CN)

(72) Inventors: Yimei Tang, Dongguan (CN); Yi Sun, Dongguan (CN); Jingming Wan, Dongguan (CN); Haijin Hu, Dongguan (CN); Xinquan Zhou, Dongguan (CN); Guangwei Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/804,403

(22) Filed: Nov. 6, 2017

(65) Prior Publication Data

US 2018/0198965 A1    Jul. 12, 2018

(30) Foreign Application Priority Data

Jan. 11, 2017    (CN) .......................... 2017 1 0021115

(51) Int. Cl.
*H04N 5/225*     (2006.01)
*H04N 5/272*     (2006.01)

(52) U.S. Cl.
CPC ......... *H04N 5/2257* (2013.01); *H04N 5/2251* (2013.01); *H04N 5/2252* (2013.01); *H04N 5/2253* (2013.01); *H04N 5/2258* (2013.01); *H04N 5/272* (2013.01)

(58) Field of Classification Search
CPC .. H04N 5/2251; H04N 5/2252; H04N 5/2253; H04N 5/2258
See application file for complete search history.

(56) References Cited

U.S. PATENT DOCUMENTS

| 5,455,625 | A  | * | 10/1995 | Englander | ............... B60R 11/04 348/372 |
| 9,215,300 | B2 |   | 12/2015 | Byun      |                                    |
| 9,578,758 | B2 |   | 2/2017  | Mo et al. |                                    |
| 2007/0183058 | A1 | * | 8/2007 | Bito    | ................... G02B 13/0065 359/676 |
| 2008/0011453 | A1 | * | 1/2008 | Liang   | .................. H05K 7/2049 165/80.3 |

(Continued)

FOREIGN PATENT DOCUMENTS

| CN | 102033410 A  | 4/2011 |
| CN | 203149258 U  | 8/2013 |

(Continued)

OTHER PUBLICATIONS

First Office Action of the European application No. 17201778.2, dated Jul. 15, 2019.

*Primary Examiner* — Hung H Lam

(57) ABSTRACT

A camera module includes a first camera, a light guide component, and a fixing component. The light guide component is configured to collect light from outside and guide the light into the first camera. The fixing component is disposed on a periphery of the first camera and the light guide component. An optical center of the first camera is coincident with an optical center of the light guide component.

17 Claims, 6 Drawing Sheets

(56) References Cited

U.S. PATENT DOCUMENTS

| | | | | |
|---|---|---|---|---|
| 2009/0141452 A1* | 6/2009 | Wayman | ............... | H01L 23/367 |
| | | | | 361/704 |
| 2011/0076000 A1 | 3/2011 | Chang | | |
| 2013/0033581 A1* | 2/2013 | Woo | .................... | H04N 5/2257 |
| | | | | 348/47 |
| 2013/0194782 A1 | 8/2013 | Byun | | |
| 2014/0085836 A1 | 3/2014 | Mo et al. | | |
| 2014/0368711 A1* | 12/2014 | O'Brien | ............... | H04N 5/2254 |
| | | | | 348/308 |
| 2015/0286033 A1 | 10/2015 | Osborne | | |
| 2016/0044250 A1* | 2/2016 | Shabtay | ................ | H04N 5/247 |
| | | | | 348/240.3 |
| 2016/0165115 A1* | 6/2016 | Nakada | ................ | H04N 5/2251 |
| | | | | 348/374 |
| 2016/0353008 A1 | 12/2016 | Osborne | | |
| 2018/0024329 A1* | 1/2018 | Goldenberg | ........... | G02B 13/16 |
| | | | | 359/557 |
| 2018/0217475 A1* | 8/2018 | Goldenberg | ............. | G03B 3/10 |

FOREIGN PATENT DOCUMENTS

| | | |
|---|---|---|
| CN | 204517922 U | 7/2015 |
| CN | 10537654 A | 3/2016 |
| CN | 105573019 A | 5/2016 |
| CN | 205545562 U | 8/2016 |
| CN | 106164732 A | 11/2016 |
| CN | 106791329 A | 5/2017 |
| WO | 2014109475 A1 | 7/2014 |
| WO | 2016166730 A1 | 10/2016 |

\* cited by examiner

US 10,554,867 B2

CAMERA MODULE APPLIED TO TERMINAL AND TERMINAL INCLUDING SAME

CROSS REFERENCE TO RELATED APPLICATION

This application claims priority to Chinese Application No. 201710021115.2 filed Jan. 11, 2017. The entire disclosure of the above application is incorporated herein by reference in its entirety.

BACKGROUND

Field

The present disclosure relates to the field of terminals, and particularly to a camera module applied to a terminal, and a terminal including same.

Background

Because of the wide use of terminals as well as higher requirements in picture taking requirements of users, manufacturers continue to improve picture taking abilities of the terminals.

In order to improve picture taking performance, the terminal includes a camera module including a primary camera module and a secondary camera module. One of the primary camera module and the secondary camera module uses a wide-angle lens, and another of the primary camera module and the secondary camera module uses an optical zoom lens. The existing secondary camera module is fixed in position by having a bottom part of the secondary camera module secured to a circuit board. However, because the terminal is often affected by external forces, such as shaking or falling, which easily leads to offset of an optical center of the secondary camera module. This results in that the secondary camera cannot completely collect light from an object to be photographed, thereby reducing the quality of the picture taken by the terminal.

DETAILED DESCRIPTION OF ILLUSTRATED EMBODIMENTS

Figure 1:
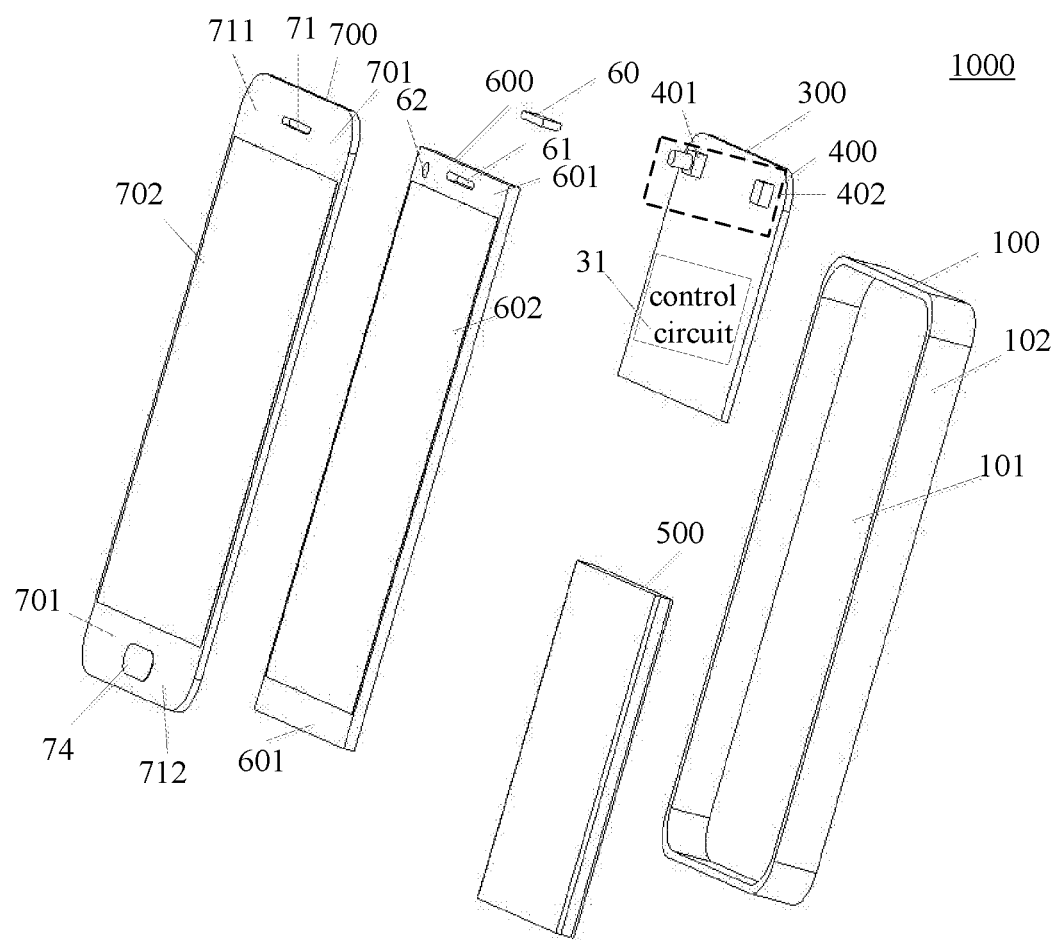
FIG. 1 is an exploded schematic view of a terminal according to an embodiment of the present disclosure.
Figure 2:
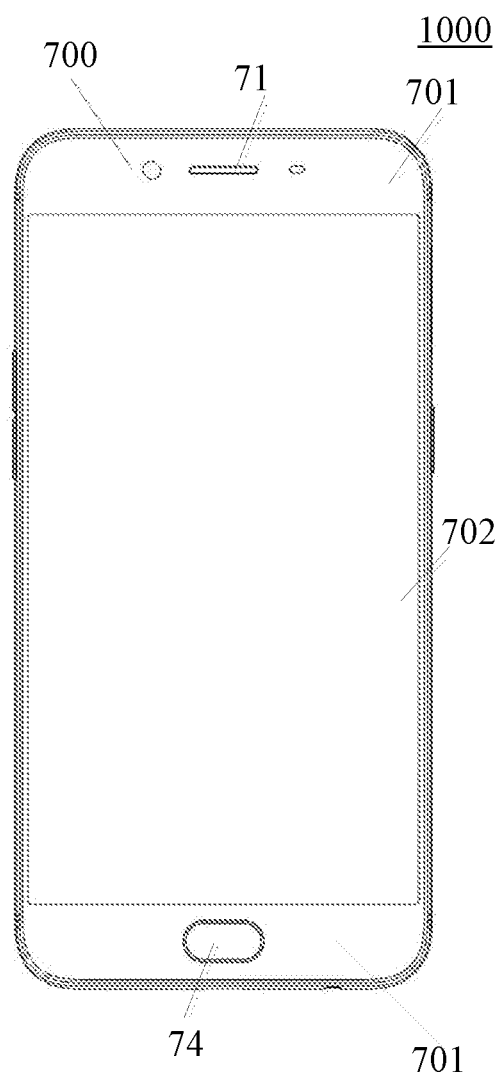
FIG. 2 is a schematic view of a cover plate of the terminal illustrated in FIG. 1.
Figure 3:
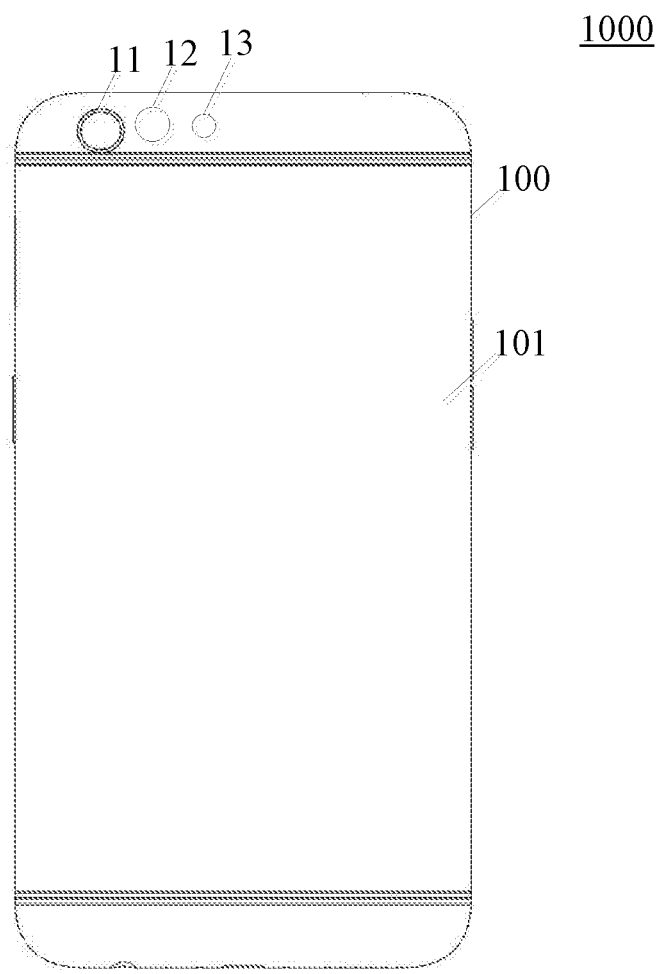
FIG. 3 is a schematic view of a rear cover of the terminal illustrated in FIG. 1.

In order to more clearly illustrate the embodiments of the present disclosure or related art, the following figures described in the embodiments are briefly introduced. It is obvious that the drawings are merely some embodiments of the present disclosure, a person skilled in the art can obtain other figures according to these figures under the premise that the person does not pay laborious endeavor.

The terms "first," "second," and "third" in the present disclosure are used for distinguishing different objects but not for describing the specific sequence. Furthermore, the terms "including," "having," and any deformations are intended to cover non-exclusive inclusion. For example, a process, a method, a system, a product, or a device comprising a series of steps or units which is not limited to the steps or units already listed, but optionally further includes steps or units which are not listed, or optionally further includes other steps or units which are inherent in the process, the method, the product, or the device.

Reference herein to "embodiment" means that a particular feature, structure, or characteristic described in connection with the embodiment can be included in at least one embodiment of the present disclosure. The appearances of this phrase in various places in the specification are not necessarily all referring to the same embodiment, nor are separate or alternative embodiments mutually exclusive of other embodiments. The embodiments described herein, explicitly and implicitly understood by a person skilled in the art, may be combined with other embodiments.

Referring to FIG. 1 to FIG. 4, a terminal 1000 of an embodiment includes a rear cover 100, a front case 200, a circuit board 300, a camera module 400, a battery 500, a display screen 600, and a cover plate 700.

The rear cover 100 includes a body 101 and a side wall 102 disposed on a periphery of the body, and the side wall 102 extends in a direction of the cover plate 700. The periphery of the body 101 of the rear cover 100 includes a first camera hole 11, a second camera hole 12, and a flash hole 13.

The front case 200 is disposed between the rear cover 100 and the display screen 600. The circuit board 300 is mounted on the front case 200.

The camera module 400 is disposed on the circuit board 300 and includes a front camera module 401 and a rear camera module 402. The circuit board 300 further includes a control circuit 31, where the circuit board 300 may be a motherboard.

The rear camera module 402 includes a second camera module 40 and a first camera module 50 arranged side by side, the second camera module 40 and the first camera module 50 are fixed to a bottom of the circuit board 300. In one embodiment, the second camera module 40 is a primary camera module, and the first camera module 50 is a secondary camera module.

The battery 500 is mounted in the rear cover 100 and is electrically connected to the circuit board 300 to provide power to the circuit board 300.

The display screen 600 is mounted under the cover plate 700. The display screen 600 includes a non-display area 601 and a display area 602. A top of the non-display area 601 includes an opening 61 and a front camera hole 62. The opening 61 is for receiving sound from a receiver.

A black paint structure is disposed below a transparent glass corresponding to the non-display area 601 other than the front camera hole 62 and the opening 61 for shielding an internal structure of the terminal 1000. A position of the front camera hole 62 corresponds to a position of the front camera module 401.

In some embodiments, the front camera hole 62 may be omitted, or removed. Material of the display screen 600 may be made of material such as glass, ceramic, or sapphire, etc. The receiver 60 is disposed at a position corresponding to the opening 61 and an opening 71.

The cover plate 700 includes a non-display area 701 and a display area 702. The display area 702 of the cover plate 700 may be used for displaying an image or for a user to perform touch manipulation, etc. The non-display area 701 of the cover plate 700 includes a top non-display area 711 and a bottom non-display area 712. The top non-display area 711 includes the opening 71 for the receiver to emit a sound. A fingerprint identification module 74 is disposed on the bottom non-display area 712. The fingerprint identification module 74 may be used to acquire fingerprint information of the user.

Figure 5:
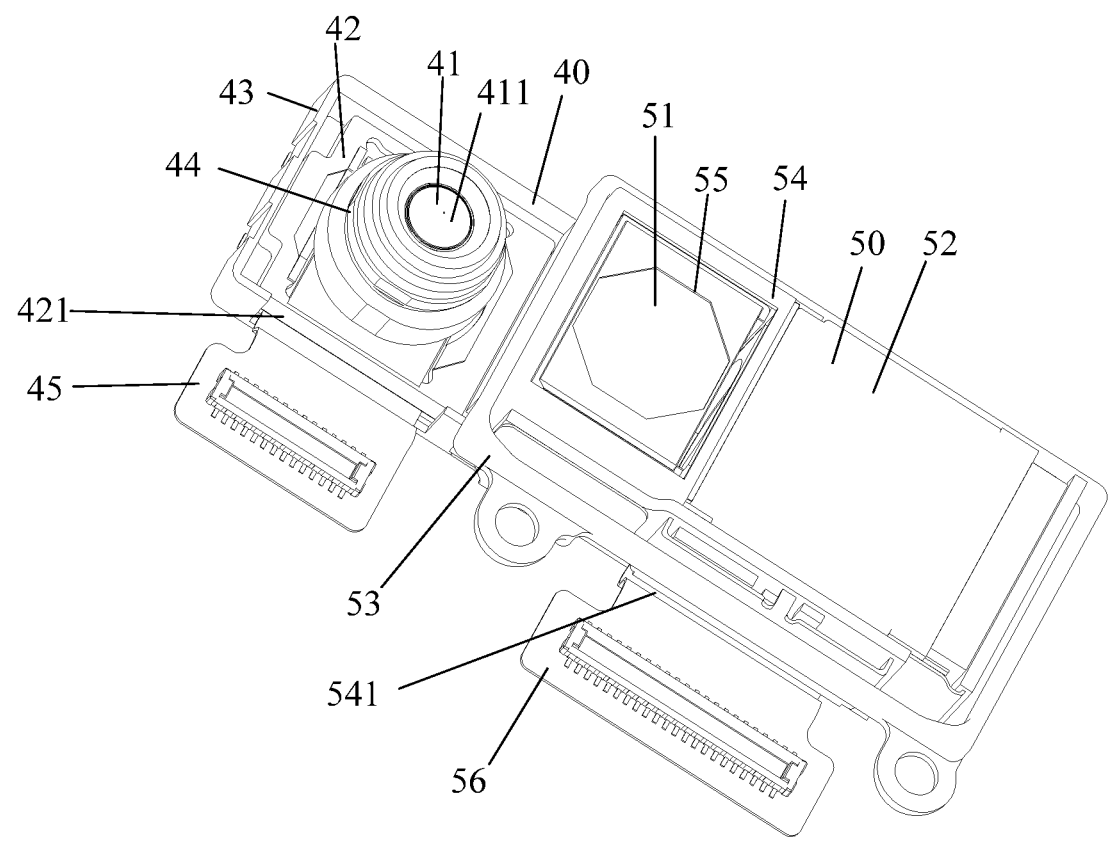
FIG. 5 is a schematic view of the camera module according to the embodiment of the present disclosure.

Referring to FIG. 5, the second camera module 40 includes a second camera 41, a first housing 42, and a first base 43. The second camera 41 is accommodated in the first housing 42. The first housing 42 is fixed to the first base 43, and the first base 43 is disposed below the first housing 42. The first housing 42 is disposed in the first base 43, and the first base 43 is fixed to the circuit board 300. The first housing 42 is a hollow structure. A top of the first housing 42 includes a hole 44 having a size that matches a size of a lens of the second camera 41. In an embodiment, material of the first housing 42 is plastic. A position of the second camera 41 corresponds to a position of the first camera hole 11. A second light output surface of the second camera 41 is toward the rear cover 100.

Figure 6:
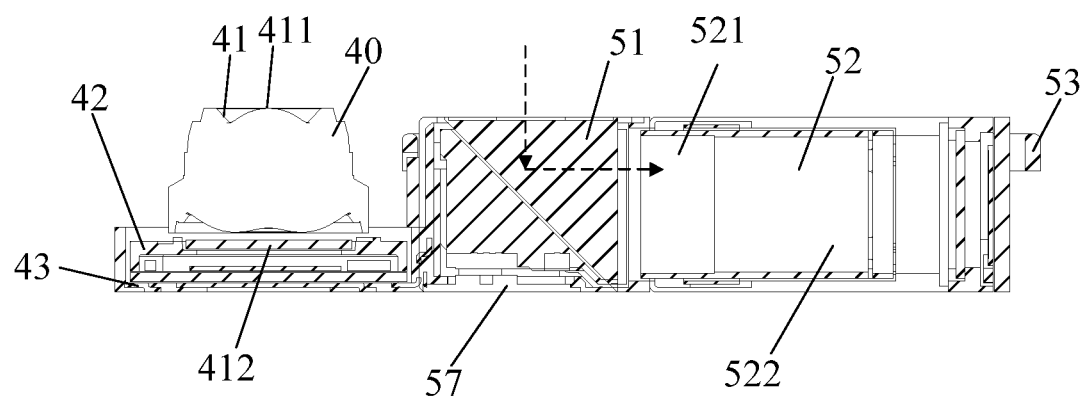
FIG. 6 is a schematic cross-sectional view of the camera module according to the embodiment of the present disclosure.

In conjunction with FIG. 5 and FIG. 6, in an embodiment, the second camera 41 includes a lens 411 and a sensor 412. A front side wall of the first housing 42 includes an opening 421 such that the sensor 412 is connected to an end of a flexible connector 45, and another end of the flexible connector 45 is connected to the circuit board 300.

The first camera module 50 includes a light guide component 51 and a first camera 52. The light guide component 51 and the first camera 52 are arranged side by side. In one embodiment, the first camera 52 is a secondary camera, and the second camera 41 is a primary camera.

The light guide component 51 is configured to collect light from outside and guide the light into the first camera 52. The light guide component 51 is disposed between the second camera module 40 and the first camera 52, and a light exit surface of the light guide component 51 is parallel to the second light output surface of the second camera 41, that is, the light exit surface of the light guide component 51 is also directed in a direction of the rear cover 100. The light exit surface of the light guide component 51 corresponds to a position of the second camera hole 12.

Referring to FIG. 6, the first light output surface of the first camera 52 is toward a right side wall of the second camera module 40, that is, a lens of the first camera 52 is toward the light exit surface of the light guide component 51. Light enters a top part of light guide component 51 and is reflected by the light guide component 51. The reflected light is guided into the first camera 52 by the light guide component 51. A direction indicated by an arrow in FIG. 6 indicates a passing direction of the light in the light guide component 51.

The first camera 52 is disposed laterally, that is, the lens of the first camera 52 is disposed leftward. The second camera 41 is disposed longitudinally, that is, the lens of the second camera 41 is disposed upwards. A length of the first camera 52 is greater than a length of the second camera 41. In an embodiment, the light guide component 51 is a prism having a triangular cross-sectional shape, such as a right-angled triangle. A leg of the right-angled triangle is toward to the rear cover 100 and another leg of right-angled triangle is toward the lens of the first camera 52. The prism is configured to collect light to an object to be photographed during specific use, and the light is guided into the first camera 52 by the prism.

Referring to FIG. 5, in an embodiment, the first camera module 50 further includes a second housing 54. The first camera 52 and the light guide component 51 are accommodated in the second housing 54. A top of the second housing 54 includes a hole 55, and a sized of the hole 55 matches a size of the light exit surface of the light guide component 51. In an embodiment, material of the second housing 54 is plastic.

In conjunction with FIG. 5 and FIG. 6, in an embodiment, the first camera 52 includes a lens 521 and a sensor 522, a side wall of the first camera 52 includes an opening 541, such that the sensor 522 is connected to an end of a flexible connector 56 and another end of the flexible connector 56 is connected to the circuit board 300.

In conjunction with FIG. 5 and FIG. 6, in an embodiment, the first camera module 50 further includes a second base 57 disposed below the second housing 54, and a bottom of the second housing 54 is fixed to the circuit board 300. In an embodiment, a right side of the first base 43 is bonded to a left side of the second base 57. In an embodiment, a bottom of the first base 43 is on a same horizontal line as a bottom of the second base 57. In an embodiment, the right side wall of the first housing 42 and a left side wall of the second housing 54 are bonded together. It is to be understood that in an embodiment, the second camera module 40 and the first camera module 50 are disposed on a same base.

Referring to FIG. 5 and FIG. 6, the first camera module 50 further includes a bracket 53, and the bracket 53 surrounds the second housing 54 such that an optical center of the first camera 52 is coincident with an optical center of the light guide component 51 so as to prevent the first camera 52 and the light guide component 51 from slung left and right. Therefore, the optical center of the first camera 52 is prevented from being shifted, that is, a direction of the lens of the first camera 52 is prevented from being displaced from a light exit direction of the light guide component 51. The bracket 53 surrounds an intermediate part of a periphery of the second housing 54, and the front case 200 abuts against a bottom peripheral of the second housing 54 so that the first camera module 50 is stably fixed to the circuit board 300.

Figure 4:
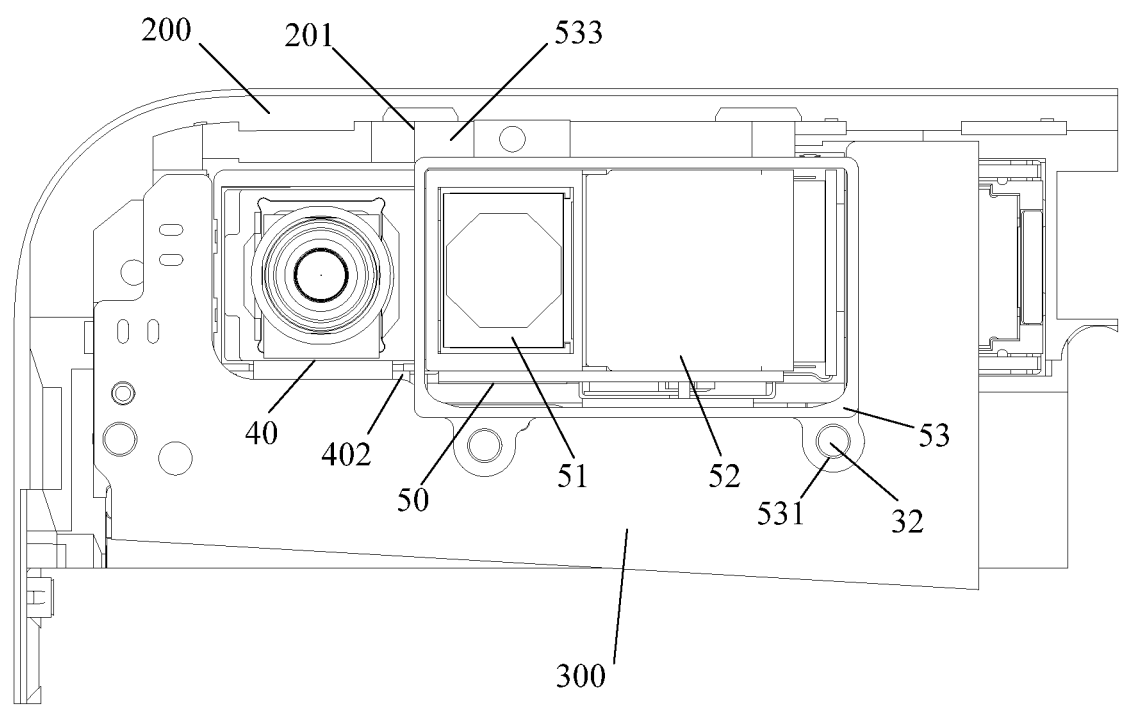
FIG. 4 is a schematic view illustrating a cooperation of a camera module, a front case, and a circuit board of the terminal illustrated in FIG. 1.
Figure 7:
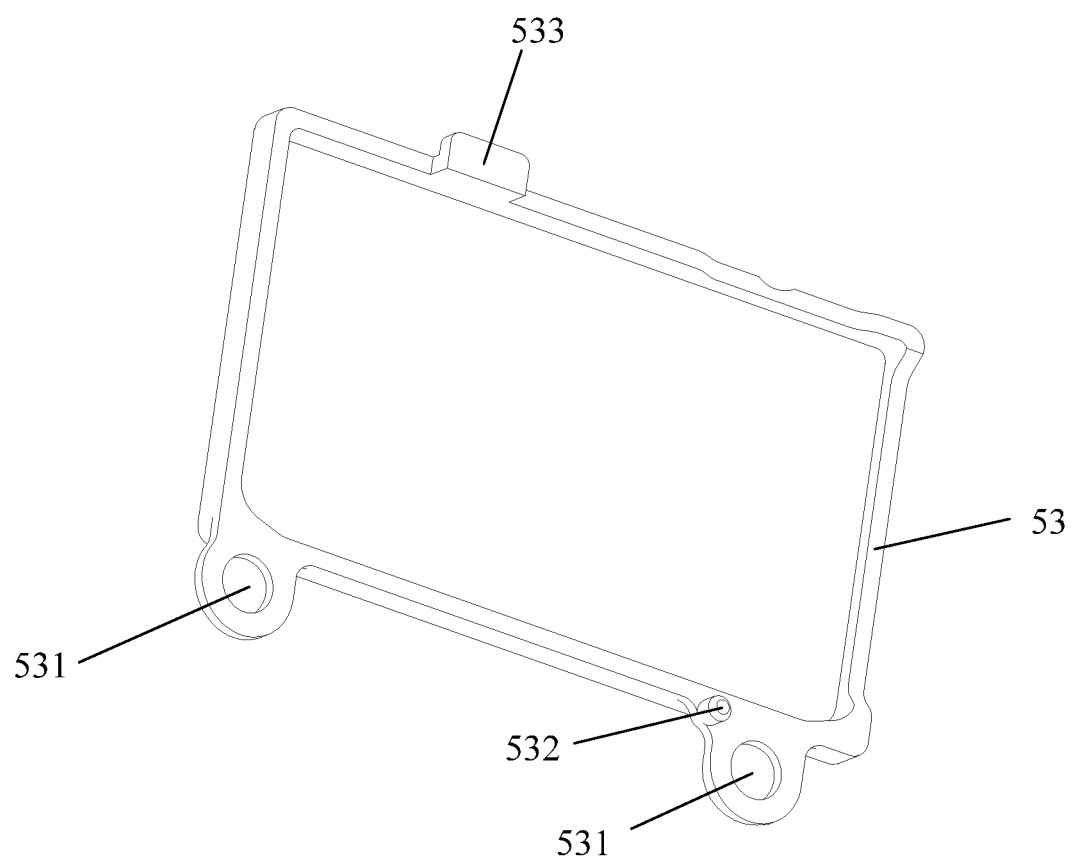
FIG. 7 is a schematic view of a bracket of the camera module according to the embodiment of the present disclosure.

In conjunction with FIG. 4 and FIG. 7, in an embodiment, the bracket 53 includes at least one positioning hole 531, and the circuit board 300 includes a catching part 32 matching the positioning hole 531. In an embodiment, the catching part 32 is a cylinder, and the catching part 32 is engaged with the positioning hole 531 during mounting so as to fix the bracket 53 to the circuit board 300 to prevent the bracket 53 from being displaced or moved.

In an embodiment, the bracket 53 includes at least one positioning hole 531, and the circuit board 300 includes a threaded hole matching the positioning hole 531. A position of the threaded hole of the circuit board 300 is aligned with the positioning hole 531, and the bracket 53 is fixed to the circuit board 300 with screws during installation.

In an embodiment, the bracket 53 further includes at least one positioning column 532, and the circuit board 300 includes a groove matching the positioning column 532. A position of the groove corresponds to a position of the positioning column 532. It is to be understood that a number of the positioning column 532 may be two or more.

In an embodiment, the bracket 53 further includes at least one positioning block 533, the front case 200 of the terminal includes an engaging part 201 matching the positioning block 533, and a position of the positioning block 533 corresponds to a position of the engaging part 201. In one embodiment, the engagement part 201 is a positioning groove, and a size of the engagement part 201 matches a shape of the positioning block 533. The positioning block 533 is caught in the positioning groove during installation, and the bracket 53 is fixed to the front case 200 to prevent the bracket 53 from being displaced or moved.

It is to be understood that positions of the engaging part 201 and the positioning block 533 are interchangeable. In an embodiment, the engagement part 201 is disposed on the bracket 53, and the positioning block 533 is disposed on the front case 200 of the terminal. A size of the engagement part 201 matches a shape of the positioning block 533. When the engagement part 201 is a positioning groove, the positioning block 533 is caught in the positioning groove during installation.

In conjunction with FIG. 4 and FIG. 5, in an embodiment, the bracket 53 is spaced from the first camera 52 and the light guide component 51, and the gap between the bracket 53, the first camera 52, and the light guide component 51 is within a preset range. For example, the gap is a distance between the bracket 53, the first camera 52, and the light guide component 51 near the periphery of the bracket 53. The preset range is, for example, less than 0.05 mm. The first camera 52 and the light guide component 51 can not be stably fixed if the gap is too large.

In an embodiment, material of the bracket 53 is powder metallurgy material. It is to be understood that material of the bracket 53 may also be another material, such as plastic.

It is to be understood that, in an embodiment, the bracket 53 may also surround the periphery of the second camera module 40, the first camera 52, and the light guide component 51 to secure an optical center of the second camera module 40 and of the light guide component 51 such that a center direction of the lens of the second camera 41 and a center direction of the light exit surface of the light guide component 51 are kept uniform.

It is to be understood that first camera module 50 is not limited to be fixed by the bracket 53, for example, a fixed part such as a colloid or a ferrule, etc. may be disposed around the first camera module 50, and a number of colloids or ferrules may be multiple so as to prevent the first camera 52 and the light guide component 51 from slung left and right.

It is to be understood that, in an embodiment, a plurality of limit posts may be disposed around the second housing 54, and the limit posts may be longitudinally arranged. An end of the limit post is fixed to the circuit board 300. In another embodiment, a limit post is disposed at four corners of the second housing 54.

In an embodiment, the limit post is bonded to the circuit board 300. In an embodiment, the circuit board 300 includes a groove, and the limit post is engaged in the groove. A position of the limit post corresponds to a position of the groove, and a shape of the limit post matches a shape of the groove. In order to better secure the first camera and the light guide component, a gap between adjacent two of the limit posts is within a preset distance.

In an embodiment, the second camera 41 is a wide-angle lens, the first camera 52 is an optical zoom lens. The optical zoom does not need to use interpolation for digital zoom and does not have a picture quality loss when an image is enlarged. Combination of the lens and the digital zoom makes it possible to achieve smooth zoom when shooting video, improving picture taking performance. In addition, the camera module can improve picture taking performance under low light environment, etc.

In the embodiment of the present disclosure, a working principle of the camera module is as follows.

The second camera module 40 and the first camera module 50 are simultaneously used at the time of taking a picture. The second camera module 40 collects light of an area where an object to be photographed is located, generates an optical image by the lens of the second camera module 40, projects the optical image onto a surface of an image sensor, converts the optical image into an electrical signal, converts the electrical signal into a digital image signal after analog-to-digital conversion, and transmits the digital image signal to a digital signal processing chip for processing to obtain a first image.

The first camera module 50 collects light of an area where an object to be photographed is located by the light guide component 51, generates an optical image by the lens of the first camera 52, projects the optical image onto a surface of an image sensor, converts the optical image into an electrical signal, converts the electrical signal into a digital image signal after analog-to-digital conversion, and transmits the digital image signal to a digital signal processing chip for processing to obtain a second image. The first image and the second image are subjected to combination processing to obtain a final photograph. In an embodiment, the first image is a person image, and the second image is a background image.

Since the first camera 52 and the light guide component 51 are fixed by the same bracket 53, it is possible to prevent the first camera 52 from being misaligned with the light guide component 51 to prevent the light guide component 51 from completely introducing the collected light into the first camera 52, thereby improving picture taking performance.

The camera module of the embodiment includes the fixing component disposed on the periphery of the first camera module to enhance stability of the first camera module and to prevent the optical center of the first camera module from being displaced when subjected to an external force, and picture taking performance is therefore improved.

In conjunction with FIG. 1 to FIG. 7, the embodiment further provides a terminal 1000 including a front case 200, a circuit board 300, and any one of the above-described camera modules 400. The circuit board 300 is mounted on the front case 200, and the camera module 400 is fixed to the circuit board 300. The circuit board 300 is electrically connected to the camera module 400.

The terminal of the embodiment includes the fixing component disposed on the periphery of the first camera module to enhance the stability of the first camera module and to prevent the optical center of the first camera module from being displaced when subjected to an external force, and picture taking performance is therefore improved.

In the description of this specification, the description of the terms "one embodiment," "some embodiments," "examples," "specific examples," or "some examples," etc., means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples.

The foregoing descriptions are merely exemplary embodiments of the present disclosure, rather than limiting the present disclosure. Various modifications and alterations may be made to the present disclosure for a person skilled in the art. Any modification, equivalent substitution, improvement or the like made within the spirit and principle of the present disclosure shall fall into the protection scope of the present disclosure.

What is claimed is:

1. A camera module, comprising: a first camera; a light guide component configured to collect light from outside and guide the light into the first camera; and a fixing component disposed on a periphery of the first camera and the light guide component, an optical center of the first camera being coincident with an optical center of the light guide component, wherein the fixing component is a bracket and the bracket is spaced from the first camera and the light guide component to form a gap within a preset range between the bracket, the first camera, and the light guide component, wherein the bracket comprises at least one first positioning part configured to fix the bracket to a circuit board of a terminal, and wherein the bracket comprises at least one second positioning part configured to fix the bracket to a front case of a terminal.

2. The camera module as claimed in claim 1, wherein the second positioning part is at least one of a positioning hole, a positioning column, and a positioning pin.

3. The camera module as claimed in claim 1, wherein material of the fixing component is powder metallurgy material.

4. The camera module as claimed in claim 1, further comprising a second camera module, wherein the second camera module is arranged side by side with the first camera and light guide component.

5. The camera module as claimed in claim 4, wherein the second camera module comprises a second camera, the light guide component is disposed between the second camera module and the first camera, the light guide component comprises a light exit surface, the first camera comprises a first light output surface, the second camera comprises a second light output surface, the light exit surface of the light guide component is parallel to the second light output surface of the second camera, and the first light output surface of the first camera is toward the second camera module.

6. The camera module as claimed in claim 5, wherein a length of the first camera is greater than a length of the second camera.

7. The camera module as claimed in claim 1, wherein the light guide component is a prism.

8. The camera module as claimed in claim 7, wherein a cross-sectional shape of the prism is a right-angled triangle, and the right-angled triangle comprises a leg toward the first camera.

9. The camera module as claimed in claim 1, wherein the light guide component and the first camera are arranged side by side.

10. The camera module as claimed in claim 4, wherein the fixing component is a bracket disposed around a periphery of the second camera module, the first camera, and the light guide component.

11. A terminal, comprising: a front case; a circuit board mounted on the front case; and a camera module fixed on the circuit board, the camera module comprising: a first camera; a light guide component configured to collect light from outside and guide the light into the first camera; and a fixing component disposed on a periphery of the first camera and the light guide component, an optical center of the first camera being coincident with an optical center of the light guide component, wherein the fixing component is a bracket and the bracket is spaced from the first camera and the light guide component to form a gap within a preset range between the bracket, the first camera, and the light guide component, the bracket comprises at least one first positioning part and at least one second positioning part, the at least one first positioning part is configured to fix the bracket to the circuit board and the at least one second positioning part is configured to fix the bracket to the front case.

12. The terminal as claimed in claim 11, wherein the circuit board comprises a catching part connected to the fixing component to fix the fixing component to the circuit board, the front case comprises an engaging part connected to the fixing component to fix the fixing component to the front case.

13. The terminal as claimed in claim 11, further comprising a second camera module, wherein the second camera module is arranged side by side with the first camera and light guide component.

14. The terminal as claimed in claim 13, wherein the second camera module comprises a second camera, the light guide component is disposed between the second camera module and the first camera, the light guide component comprises a light exit surface, the first camera comprises a first light output surface, the second camera comprises a second light output surface, the light exit surface of the light guide component is parallel to the second light output surface of the second camera, and the first light output surface of the first camera is toward the second camera module.

15. A terminal, comprising:
a front case;
a circuit board mounted on the front case; and
a camera module fixed on the circuit board, the camera module comprising:
a first camera;
a light guide component configured to collect light from outside and guide the light into the first camera; and
a fixing component disposed on a periphery of the first camera and the light guide component, an optical center of the first camera being coincident with an optical center of the light guide component, wherein the circuit board comprises a catching part connected to the fixing component to fix the fixing component to the circuit board, the front case comprises an engaging part connected to the fixing component to fix the fixing component to the front case.

16. The terminal as claimed in claim 15, wherein the fixing component is a bracket, the bracket comprises at least one first positioning part and at least one second positioning part, the at least one first positioning part is configured to fix the bracket to the circuit board and the at least one second positioning part is configured to fix the bracket to the front case.

17. The terminal as claimed in claim 15, further comprising a second camera module, wherein the second camera module is arranged side by side with the first camera and light guide component.

* * * * *